United States Patent
Frizzie

(10) Patent No.: US 10,322,924 B2
(45) Date of Patent: Jun. 18, 2019

(54) LOW IMPACT MOBILE AND MODULAR FUEL DELIVERY APPARATUS AND KIT

(71) Applicant: FRIZZIE CORP., Richmond, CA (US)

(72) Inventor: Gregory Lee Frizzie, Vacaville, CA (US)

(73) Assignee: FRIZZIE CORP., Richmond, CA (US)

(*) Notice: Subject to any disclaimer, the term of this patent is extended or adjusted under 35 U.S.C. 154(b) by 0 days.

(21) Appl. No.: 15/663,367

(22) Filed: Jul. 28, 2017

(65) Prior Publication Data

US 2019/0031497 A1    Jan. 31, 2019

(51) Int. Cl.
| | |
|---|---|
| *B60P 3/22* | (2006.01) |
| *B67D 7/40* | (2010.01) |
| *B67D 7/62* | (2010.01) |
| *B62D 33/02* | (2006.01) |
| *B67D 7/04* | (2010.01) |
| *B67D 7/84* | (2010.01) |
| *B66F 3/24* | (2006.01) |

(52) U.S. Cl.
CPC ............ *B67D 7/845* (2013.01); *B60P 3/2205* (2013.01); *B60P 3/225* (2013.01); *B60P 3/2265* (2013.01); *B62D 33/02* (2013.01); *B67D 7/04* (2013.01); *B67D 7/40* (2013.01); *B67D 7/62* (2013.01); *B66F 3/24* (2013.01)

(58) Field of Classification Search
CPC ....... B60P 3/2205; B60P 3/225; B60P 3/2265; B62D 33/02; B66F 3/24; B67D 7/04; B67D 7/845; B67D 7/40; B67D 7/62
USPC ............ 137/234.6; 180/53.3, 53.4; 222/627; 414/607, 684, 723, 724; 280/833, 839
See application file for complete search history.

(56) References Cited

U.S. PATENT DOCUMENTS

| | | | | |
|---|---|---|---|---|
| 1,538,881 | A * | 5/1925 | Barton ..................... | F04D 29/60 169/24 |
| 1,644,090 | A * | 10/1927 | Sawyer ................. | B60P 3/2265 222/145.7 |
| 1,909,733 | A * | 5/1933 | Thwaits ................ | B60P 3/2265 137/266 |
| 2,037,021 | A * | 4/1936 | Holby ..................... | B60P 3/222 180/271 |
| 2,060,484 | A * | 11/1936 | Barrett ...................... | B60P 3/24 134/22.18 |
| 2,366,925 | A * | 1/1945 | May ....................... | B60P 3/2265 222/14 |
| 2,367,032 | A * | 1/1945 | La Bour .............. | A62C 25/005 169/24 |
| 2,512,877 | A * | 6/1950 | Rike ....................... | B60P 3/225 210/172.2 |

(Continued)

OTHER PUBLICATIONS

Declaration of Gregory Lee Frizzie Under 37 C.F.R. 1.56, signed May 10, 2018, 4 pages.

*Primary Examiner* — Patrick M. Buechner
*Assistant Examiner* — Michael J. Melaragno
(74) *Attorney, Agent, or Firm* — Dergosits & Noah LLP

(57) ABSTRACT

A low-impact and modular mobile fuel delivery apparatus is disclosed with a self-propelled unit, a pump unit, and a tank unit. The self-propelled unit is adapted to minimally impact the terrain over which it travels and includes a lift for carrying the pump unit and for moving the pump unit between first and second heights. The pump unit includes a pump for drawing fuel from the tank unit and for supplying fuel to a retractable fuel-delivery hose.

15 Claims, 6 Drawing Sheets

(56) References Cited

U.S. PATENT DOCUMENTS

| | | | | |
|---|---|---|---|---|
| 2,531,001 A * | 11/1950 | Short | B64F 1/28 | 169/25 |
| 2,543,564 A * | 2/1951 | Bakewell | B60P 3/24 | 137/255 |
| 2,559,233 A * | 7/1951 | Spurin | B60P 3/2265 | 222/530 |
| 2,787,278 A * | 4/1957 | Mitchell | B66F 11/046 | 134/115 R |
| 3,003,262 A * | 10/1961 | De Biasi | B60P 1/04 | 222/627 |
| 3,229,853 A * | 1/1966 | Sacco | B67D 7/763 | 222/627 |
| 3,257,031 A * | 6/1966 | Dietz | B60P 3/14 | 222/135 |
| 3,439,372 A * | 4/1969 | Collier | B66F 11/046 | 15/50.1 |
| 3,570,503 A * | 3/1971 | DeBoliac | B66F 11/042 | 134/103.1 |
| 3,580,420 A * | 5/1971 | Kennedy | B08B 9/0321 | 222/1 |
| 3,616,123 A * | 10/1971 | Reynolds, Jr. | B29C 53/12 | 138/129 |
| 3,807,437 A * | 4/1974 | Lentel | B60P 3/2265 | 137/355.12 |
| 4,050,858 A * | 9/1977 | Ewbank | E21B 19/22 | 415/168.2 |
| 4,131,214 A * | 12/1978 | Rogers | B60P 3/225 | 222/1 |
| 4,593,855 A * | 6/1986 | Forsyth | A62C 27/00 | 169/24 |
| 4,729,434 A * | 3/1988 | Rohrbach | A62C 27/00 | 169/15 |
| 4,911,330 A * | 3/1990 | Vlaanderen | B60P 3/224 | 222/132 |
| 4,917,193 A * | 4/1990 | Ockler | A62C 27/00 | 169/13 |
| 5,476,146 A * | 12/1995 | Brown | A62C 27/00 | 169/14 |
| 5,653,293 A * | 8/1997 | Ellis | H02G 1/06 | 172/438 |
| 5,951,236 A * | 9/1999 | Thompson | B66F 9/06 | 414/607 |
| 5,975,162 A * | 11/1999 | Link, Jr. | F17C 13/002 | 141/192 |
| 6,029,750 A * | 2/2000 | Carrier | A62C 27/00 | 169/13 |
| 6,340,177 B1 * | 1/2002 | Granderson | B60P 3/2215 | 169/24 |
| 6,761,135 B1 * | 7/2004 | Becktold | B08B 3/026 | 122/396 |
| 7,293,802 B2 * | 11/2007 | Bachman | B60P 3/14 | 137/185 |
| 7,300,073 B2 * | 11/2007 | Bachman | B60P 3/2205 | 137/590 |
| 7,404,580 B2 * | 7/2008 | Michael | B29C 41/06 | 220/562 |
| 7,520,411 B2 * | 4/2009 | Bieker | B60P 3/2215 | 169/24 |
| 7,836,963 B2 * | 11/2010 | Collins | A62C 27/00 | 169/13 |
| 7,992,648 B2 * | 8/2011 | Groonwald | A62C 27/00 | 169/52 |
| 8,950,525 B2 * | 2/2015 | Marotte | B60K 25/06 | 180/53.7 |
| 9,133,014 B2 * | 9/2015 | Kenan | B67D 7/40 | |
| 9,150,182 B1 | 10/2015 | Schlangen | B60G 3/20 | |
| 9,216,777 B2 * | 12/2015 | Nakamura | B62D 21/186 | |
| 9,663,018 B2 * | 5/2017 | Coulter | B60P 3/2265 | |
| 9,713,988 B2 * | 7/2017 | Vertanen | B60P 3/40 | |
| 9,759,056 B2 * | 9/2017 | Smit | E21F 16/00 | |
| 2002/0043409 A1 * | 4/2002 | Parkert | B60K 25/04 | 180/53.4 |
| 2003/0116212 A1 * | 6/2003 | Thomson | F16L 11/088 | 138/111 |
| 2003/0235490 A1 * | 12/2003 | Dale | B66F 9/06 | 414/607 |
| 2006/0120848 A1 * | 6/2006 | Guhr | E02F 3/96 | 414/723 |
| 2006/0245890 A1 * | 11/2006 | Hartman | B65D 19/0022 | 414/607 |
| 2006/0245891 A1 * | 11/2006 | Flaherty | B66F 9/065 | 414/607 |
| 2007/0280810 A1 * | 12/2007 | Lougheed | A01B 59/062 | 414/723 |
| 2008/0135119 A1 * | 6/2008 | Tonooka | D03D 3/02 | 138/110 |
| 2009/0200333 A1 * | 8/2009 | Bauer | B60P 3/14 | 222/1 |
| 2010/0200107 A1 * | 8/2010 | Weathers | B67D 7/02 | 141/4 |
| 2012/0182156 A1 * | 7/2012 | Portocalis | B64F 1/28 | 340/870.02 |
| 2013/0056978 A1 * | 3/2013 | Swift | F16L 19/028 | 285/332 |
| 2016/0167561 A1 * | 6/2016 | Coulter | B60P 3/2265 | 280/782 |
| 2016/0348897 A1 * | 12/2016 | Suntup | F04B 13/00 | |
| 2016/0362195 A1 * | 12/2016 | Wilkinson | B64F 1/28 | |
| 2017/0275149 A1 * | 9/2017 | Schmidt | B67D 7/365 | |
| 2017/0283240 A1 * | 10/2017 | Wruck | B60P 3/2215 | |
| 2017/0313570 A1 * | 11/2017 | Kittoe | B67D 7/04 | |
| 2018/0025345 A1 * | 1/2018 | Kittoe | G06Q 20/341 | |

* cited by examiner

LOW IMPACT MOBILE AND MODULAR FUEL DELIVERY APPARATUS AND KIT

FIELD OF THE INVENTION

The application relates generally to the delivery and distribution of fuel and more particularly to a novel apparatus expressible in a mobile and modular form and also as a kit, and capable of causing the delivery and distribution of fuel in a low impact, and energy and time efficient fashion to locations that are not practically accessible by existing fuel tanker trucks or other apparatuses or devices which are currently intended for fuel delivery and distribution.

BACKGROUND

The outdoor event industry encompasses a great number of varying types of functions and gatherings of people, ranging from concerts, festivals, and in some cases the temporary creation of entire communities, to political and governmental events and rallies, to county fairs, flea markets, trade shows, expositions and sporting events. The industry is exceedingly diverse on the one hand but also shares a number commonalities including the fact that most large scale outdoor events result in substantial use of energy and the need for a variety of power supply sources.

Despite significant advances in the transport and accessibility of alternative energy sources in recent years, a substantial percentage of outdoor events of all sizes are still reliant to a significant degree, if not entirely, upon the provision and use of liquid fuel to run and supply energy sources such as generators and fueling and charging stations. At such events, the direct delivery to and use of fuel by individual motorized devices is also often necessary, as is the storage and periodic refilling of onsite fuel containers.

A common problem with meeting the necessary requirements for fuel delivery and distribution at outdoor events is the feasibility of transporting fuel to onsite locations where and when it is needed and distributing it in a time efficient and targeted fashion. Frequently, outdoor events are largely landlocked, meaning that significant portions of the event space, if not the entire space, have no road or pathway accessibility intended for the ingress and egress of vehicles, let alone tanker trucks or other commercial or industrial vehicles that are outfitted for the transport and delivery of fuel. Further complicating the delivery and distribution of fuel is the fact that event spaces are often sprawling, with numerous discreet locations that may require fuel delivery, some more easily vehicle accessible than others. Moreover, once an event starts, crowd density and the behavior and personal awareness of individuals can present unique logistical and challenges to refueling or on demand fueling needs.

In the current state of the industry, these problems are typically addressed by the advance delivery of large amounts of fuel to centralized onsite locations such as fuel tanks and the set-up of individualized fuel storage locations. On demand needs for fuel or refueling during events themselves are then often met by the delivery of fuel in jerry-rigged containers or transport mechanisms, off-hour supplying, or even collection, carrying and delivery by hand.

All too often, the manner of addressing the problems with fuel delivery and distribution at outdoor events, results in the creation of a whole new set of problems. Onsite fuel tanks pose safety hazards, access to them is restricted and monitored, they are unsightly and take up large amounts of space, their placement can significantly disturb the land upon which they sit as well as lasting environmental impact, and their use does little to nothing to solve the need for fuel supply to a diverse number of discreet locations that may be necessary at any given event. Meanwhile, the advance delivery of fuel by tanker trucks requires significant logistical coordination, can still have a major impact on the land for an event space itself, and must typically take place before the infrastructure of an event space is even substantially completed, as the trucks will otherwise be unable to maneuver or effectively reach their delivery points. However, the precise areas in which fuel may be needed, may not even be fully known until event space infrastructure is actually implemented, so pre-established fueling points may have to be relocated during the middle of an event setup process. In turn, the delivery and distribution of fuel through individual containers, jerry-rigged smaller vehicles not intended for fuel transport, or by hand, is highly inefficient and often times hazardous.

In all, the current state of delivering, supplying and distributing fuel for use at outdoor events is a time consuming, expensive and largely inefficient and inflexible process which poses inherent safety concerns and can add layers to any event planning and implementation process.

BRIEF SUMMARY

Embodiments described in this application solve these problems in a novel fashion by providing a mobile, modular, and low impact means of delivering and distributing fuel to desired locations without the need for traditional vehicle access or advance fuel delivery or storage.

An embodiment may generally be comprised of a multi-wheeled self-propelled mobile unit which may be referred to as a vehicle. The general dimensions and features of the mobile unit may be similar to that of a Bobcat brand Toolcat Utility vehicle or a golf cart type unit. The vehicle may have a bed, an engine, a hydraulic lift and a passenger carriage. The apparatus may then be expressed by a novel set of fabricated modifications to such a vehicle with primary features including, a tank unit, which may be a fuel tank, a fuel intake channel, a fuel distribution channel, a power-driven pump unit with inlet and outlet features, an electric motor, a first retractable hose, pump intake and outtake ports, a first hose reel, a cargo frame and a lift cage.

The various components which make up the apparatus are customizable and removable, enabling the apparatus to be expressed in the form of kit that can be attached to a desired mobile unit and exist in a modular form. When in operation, an apparatus may be capable of reaching off-road locations in a time efficient and low impact manner while carrying large quantities of fuel for rapid distribution and navigating areas with little room to maneuver and heavy foot traffic.

The apparatus may include a fuel tank which may be referred to as an L-shaped tank. An L-shaped tank may be placed in the bed of a vehicle. The L-shaped tank may be fabricated to fit the dimensions of a vehicle bed. The L-shaped tank may be fabricated from a number of materials including steel, stainless steel and aluminum.

A cargo frame may be fabricated to fit over the bed of a vehicle. A cargo frame situated in this fashion may have a plurality of purposes including the creation of storage space for various components utilizable in operation of the apparatus, as well as for the securing of an L-shaped tank in the vehicle bed.

A cargo frame may be situated atop the bed of a vehicle by the insertion of metal slats extending from the sides of the cargo frame down into hollow walls of the vehicle bed.

An L-shaped tank may have a plurality of product intake valves with threaded interiors allowing for the connection of a delivery hose as well as for placement of a cap when product is not being delivered.

An L-shaped tank may have a plurality of baffles situated along the interior of the tank to provide stabilization for liquid contained inside the tank. Baffles may be affixed to any interior wall of the tank. An embodiment may have two baffles affixed to either the bottom or the top interior wall of the tank, running the width of the tank and each situated one-third of the way along its length A plurality of pickup tubes may be used to connect intake channels to the L-shaped tank.

The pickup tubes may be affixed to the top of the L-shaped tank, with each being capable of drawing fuel from the interior of the tank into a fuel intake channel.

A pickup tube may be constructed from a number of components. These components may include a double tap bushing, a L-shaped pipe, a handle, threaded swivels, cam-locks, and a ball valve, which may be comprised of a valve body, packing, a packing nut, a handle, a washer, a handle nut, seat rings, a stem, a friction washer, a ball, and a retainer.

A handle affixed to a ball valve portion of a pickup tube may be rotated a plurality of degrees to open or close the valve. A turning range for a ball valve handle of 45 degrees can typically achieve complete opening and complete closing of the interior of a ball valve.

A pickup tube may be capable of 360-degree rotation through use of components which include an L-shaped pipe, a gasket, a bearing and a hog ring and a third threaded swivel.

Cam locks may be affixed to an end of a ball valve to secure a cap when an intake channel is not connected to a pickup tube, as well as to affix an intake channel to a pickup tube whenever there is a desire for fuel to flow through an intake channel. (FIG. 2) Components of a pickup tube may be comprised of materials including anodized steel, aluminum, plastic and rubber.

Band clamps may be utilized to affix an intake channel to the various points along the exterior frame of the vehicle. (FIG. 4) The intake channel may generally run along the top of the vehicle's roll frame until reaching a point where it may be directed at a new angle to run across the front of the vehicle's passenger carriage.

A polymer wrap may be cutout through the use of an angle grinder or similar tool to create a protective layer which may be wrapped around the length of the intake channel.

An intake channel may be generally comprised of a rubber tube and various metal piping portions which may be L-shaped pipes. An intake channel may have its interior lined with steel threading to provide improved shape and material integrity for the intake channel and to serve as a grounding element.

The intake channel may run in any desired direction through use of components which include an L-shaped pipe, a gasket, a bearing and a hog ring and a threaded swivel. These components may assembled together and have sections of the tube portion of the intake channel connected to either end to achieve any desired angle change for the intake channel as well as extension and retraction. (FIG. 4)

Angle changes prepared in this fashion may be adjusted and are flexible over a 360-degree range of motion. Flexibility of the intake channel is desirable so that it may be positioned in space at various angles and stretch to various heights while the apparatus is being operated without significant risk of breaking. Any swivel utilized as a part of the intake channel may be greased to reduce the potential for leakage of fuel at tube attachment points by creating a seal.

When the hydraulic lift portion of the vehicle is in a retracted position, the intake channel can be sufficiently flexible so as to fold across the front of the vehicle's passenger carriage before reaching a point where it may be coupled with and run parallel to a hydraulic lift hose.

An intake channel and hydraulic lift hose may both be wrapped together in polymer protective layering and extend towards a lift cage attached to the front of the vehicle before separating at about the point where the lift hose connects to the hydraulic lift and the intake channel connects to a pump unit.

Use of polymer protective layering is a desirable means of covering the intake channel and the lift hose because it is flexible enough to allow both the intake channel and lift hose to extend, retract and be positioned over a range of angles and space as the lift cage is maneuvered, while still providing a strong protective layer.

The intake channel and the hydraulic lift hose may also form a part of the apparatus without being routed together.

At a desired section of the lift cage, the intake channel may run through the lift cage and be connected with a pump unit which may be housed in or attached to the lift cage.

The pump into which the intake channel runs may be a Banjo Pump, which can be combination of a generic pump and engine connected to one another and housed in a single casing. The pump may also be a 12-volt pump or a hydraulic pump.

The pump may be utilized to cause the drawing of fuel from the L-shaped tank into and then out of the intake channel flow before passing through the pump and into an outtake channel. The pump may be powered by, e.g., an electric motor or a gasoline engine.

A distribution channel may extend out from the pump unit and may be connected to a retractable hose. The distribution channel, similar to the intake channel may be comprised of a combination of rubber tubing and metal swivels and connectors to allow for desired flexibility over a range of angles and positions.

A retractable hose may be spooled around a hose reel and may exist in a variety of lengths including but not limited to one hundred feet. The hose reel may be rotated by chain-driven end-plates comprising either side of the hose reel and may be situated in a protective lift cage along with the pump.

The hose reel may be operated both manually and through use of an electric motor drawing power from the main battery of the vehicle or from an auxiliary battery as desired.

The distribution hose may terminate at an auto flow-nozzle which can be used to control the flow of fuel from the hose to desired receptacles for the distribution of fuel.

The lift cage may be attached to the arm of the hydraulic lift by the lift arm having one or more attachment prongs which may be inserted into hollowed section of the lift cage frame. The lift cage housing the pump and hose reel may be detached from the hydraulic lift. This is facilitated by disconnecting the majority of the intake channel from the pump and utilizing the hydraulic lift to withdraw its attachment prongs from the cage.

For a more complete understanding of all features and possible embodiments, reference should be made to the following detailed description of preferred embodiments, which are each and collectively intended to illustrate, not limit, the disclosed subject matter.

BRIEF DESCRIPTION OF THE DRAWINGS

The subject matter disclosed is illustrated by way of example and not limitation in the figures of the accompanying drawings, in which like references indicate similar elements, and in which.

DETAILED DESCRIPTION

Figure 1:
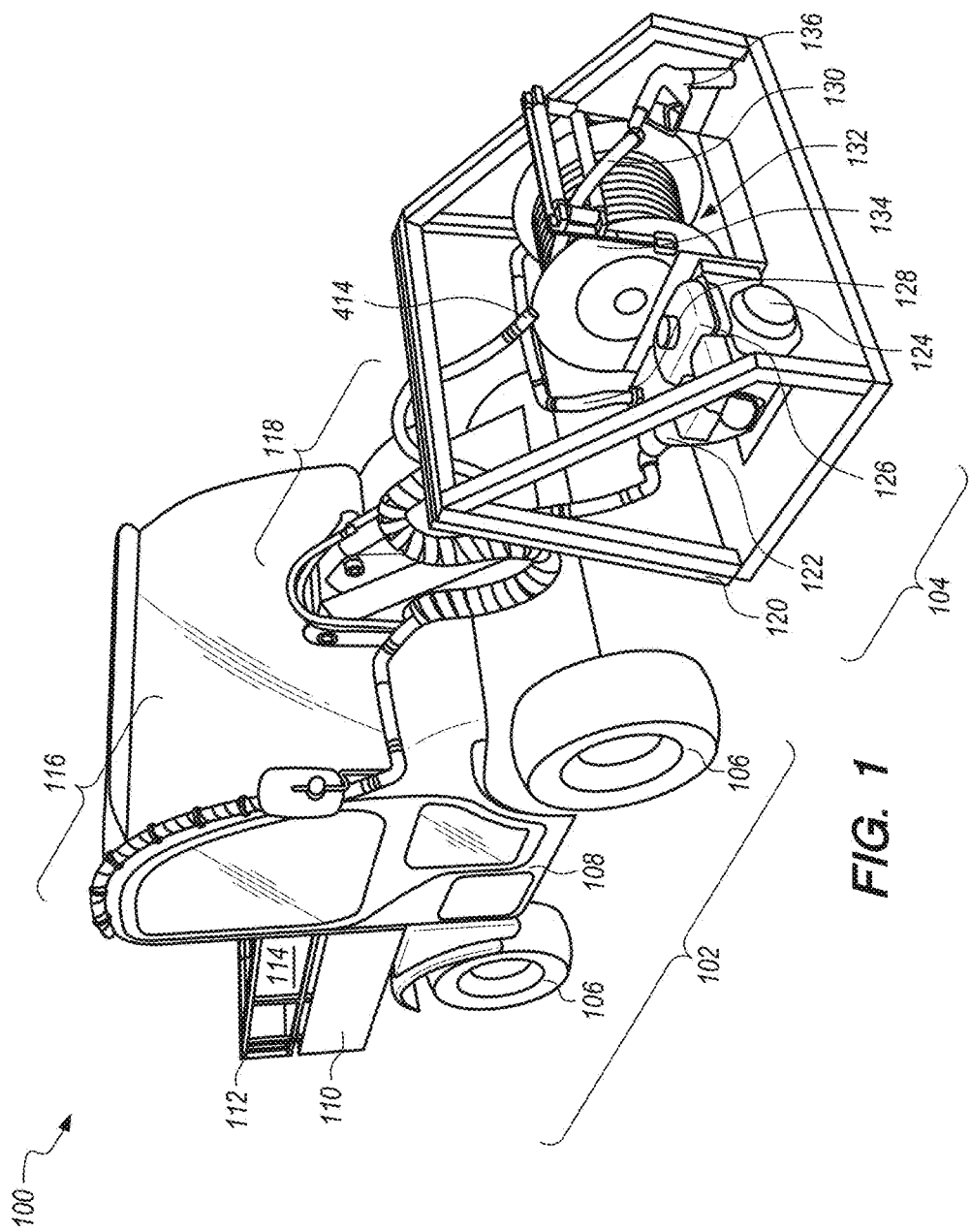
FIG. 1 illustrates a perspective view of an embodiment of an apparatus for delivering fuel.

FIG. 1 illustrates a perspective view of an embodiment of an apparatus 100 for delivering fuel. Apparatus 100 may generally be comprised of a multi-wheeled self-propelled mobile unit 102 (which may be referred to as vehicle 102). Vehicle 102 may have a bed 110, an engine, a hydraulic lift arm 118 and a passenger carriage 108.

Apparatus 100 may then be expressed by a novel set of fabricated modifications to vehicle 102 with primary features including: a tank unit 200 (FIG. 2) including a fuel tank 114, a fuel intake channel 116, a fuel distribution channel 128, intake and outtake valves, a power-driven pump unit 104 with a pump 122 and an encased motor 124 with an auxiliary fuel supply 126, a fuel distribution channel 128, a first retractable hose 130, an adjustable release nozzle 136, a first hose reel 134 (which can be powered by an electric motor), a cargo frame 112, and a lift cage 104.

Vehicle 102 may be a four-wheeled vehicle which is self-propelled. The vehicle may include four wheels 106 with each wheel fitted with a low impact tire and configured to rotate about a vertical axis.

Pump unit 104 may include a lift cage 120 (itself including a base and frame), pump 122 with its encased motor 124 and auxiliary fuel supply 126, fuel distribution channel 128, a first retractable hose 130, and a first hose reel 132. Hose reel 132 may rest inside lift cage 120 on its own elevated base with side frames capable of bracketing the reel and hose 130 may be spooled around a central portion of the reel 132.

Figure 2:
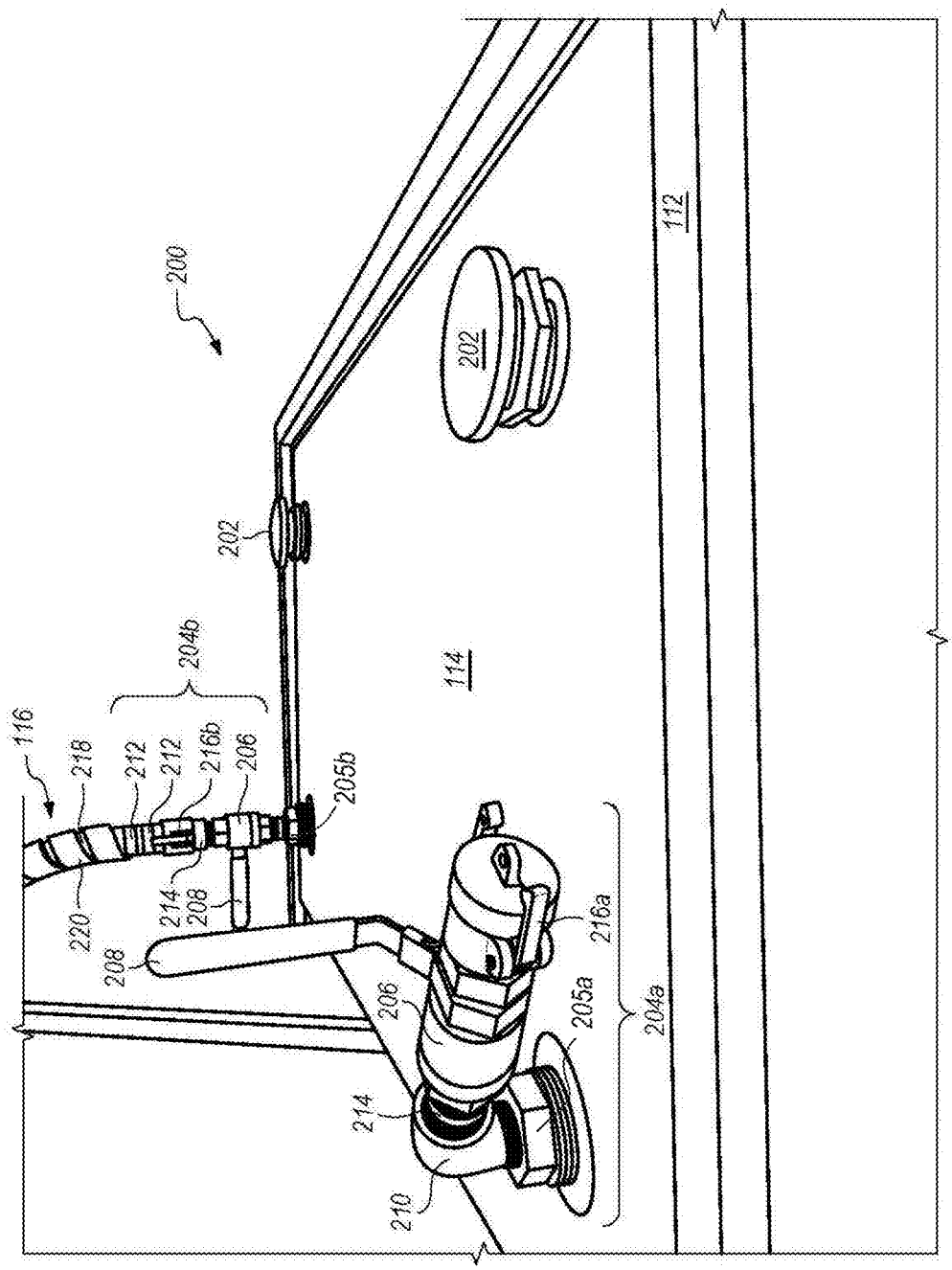
FIG. 2 illustrates a perspective view of an upper portion of a tank unit of the embodiment of an apparatus for delivering fuel of FIG. 1.
Figure 3:
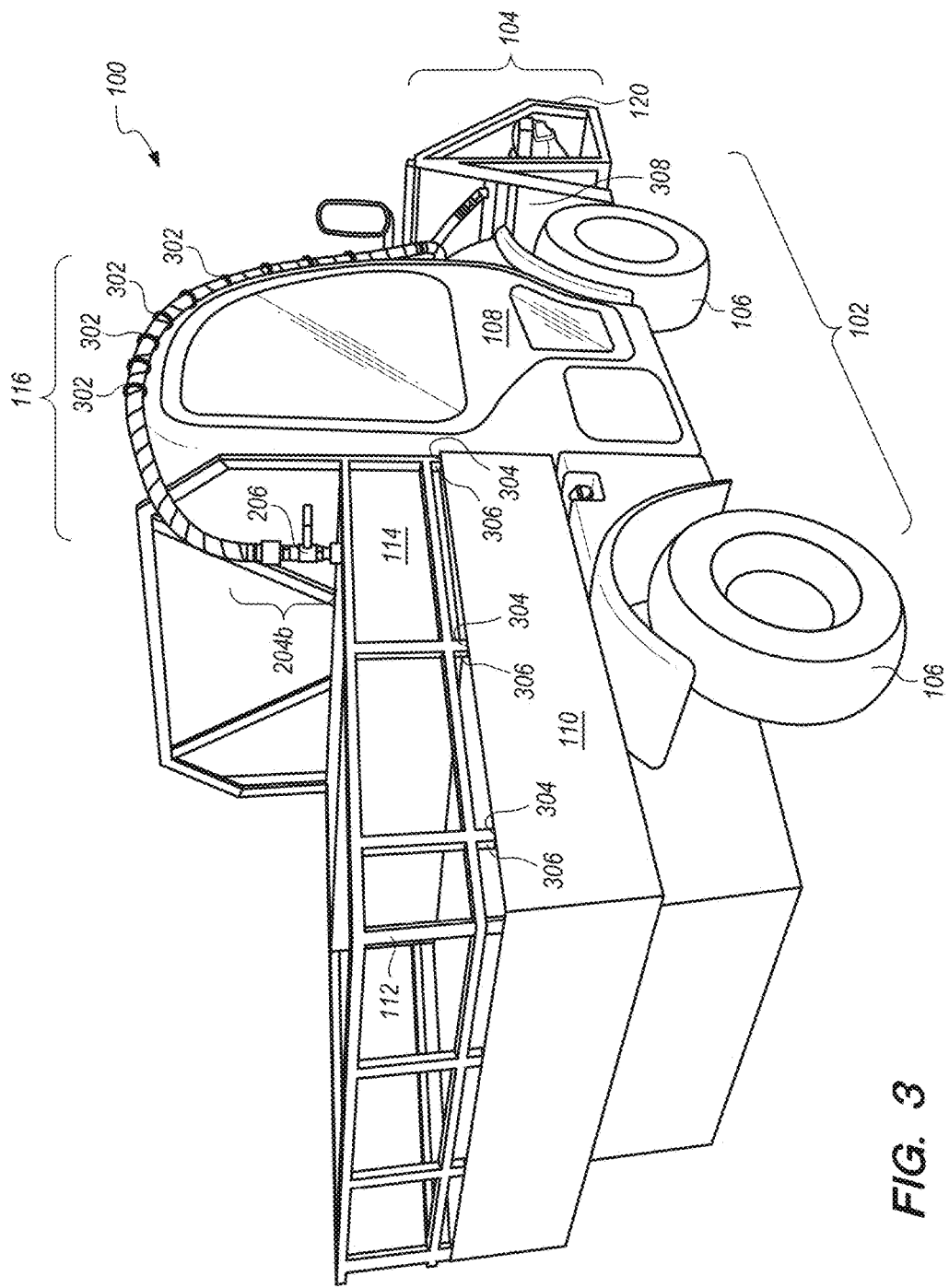
FIG. 3 illustrates a perspective view of the embodiment of an apparatus for delivering fuel of FIG. 1.

FIG. 3 illustrates a perspective view of the embodiment of an apparatus for delivering fuel of FIG. 1. As depicted in FIG. 3, a fuel unit (200, FIG. 2) may include fuel tank 114 which may be L-shaped with approximately one-third of the length of the tank extending along a vertical axis for a greater distance than the rest of the tank width, giving the tank a step-like appearance. Fabrication of the fuel tank in this fashion allows for increased fuel capacity which may exceed 250 gallons while also allowing for cargo or tools to be placed within the confines of a cargo frame by placing them on the portion of the top surface of the fuel tank which is not elevated. The fuel tank may be fabricated from materials which include steel, stainless steel, and aluminum.

Fuel tank 114 may fabricated to fit inside bed 110 of vehicle 102 and may be secured within a cargo frame 112. Cargo frame 112 may have a plurality of metal bars 306 that extend from the upper horizontal bar of the frame, past the lower bar to couple with openings 304 in the wall of the vehicle bed 110, thereby allowing cargo frame 110 to rest securely. The interior dimensions of space enclosed by the vehicle bed and by the cargo frame may be slightly larger than the exterior dimensions of the fuel tank in order to allow the fuel tank freedom to expand and contract, reducing the risk of excess pressure or a rupture while still allowing the tank to rest securely in the vehicle while in transit.

FIG. 2 illustrates a perspective view of an upper portion of a tank unit 200 of the embodiment of an apparatus for delivering fuel of FIG. 1. As depicted in FIG. 2, tank unit 200 may have fuel tank 114 with topside surface area bordered by horizontal bars of cargo frame 112. The topside surface area of the fuel tank may be affixed with a plurality of product intake valves 202 with threaded interiors allowing for the connection of a delivery hose as well as for placement of a cap when product is not being delivered.

A plurality of pickup tubes 204a, 204b may be used to connect intake channel 116 to fuel tank 114. Pickup tubes 204a, 204b may be affixed to the top of the fuel tank, with each being capable of drawing fuel from the interior of the tank into intake channel.

A pickup tube may be constructed from a number of components. These components may include a ball valve 206 which may be comprised of a valve body, packing, a packing nut, a handle, a washer, a handle nut, seat rings, a stem, a friction washer, a ball, and a retainer.

Components of a pickup tube 204a may include a double tap bushing 205a, a handle affixed to the ball valve 208, an L-shaped pipe 210 capable of coupling with an opening in the top surface of the fuel tank and a threaded swivel 214, a ball valve 206, connecting to a male cam lock 216a capped by a female cam lock cap.

Components of a pickup tube 204b may include a double tap bushing 205b, a handle affixed to the ball valve 208, a ball valve 206, a threaded swivel 214 connecting to a male cam lock 216b, and union components 212 (or "hog rings") for clamping to elements of input channel 116.

Handle 208 affixed to ball valve 206 may be rotated a plurality of degrees to open or close the valve. A turning range for a ball valve handle of 45 degrees can typically achieve complete opening and complete closing of the interior of a ball valve.

Pickup tube components including its handle 208, ball valve 206 and threaded swivel 214 enable the pickup tube to be rotatable over a 360 degree range of angles.

Cam locks 216a, 216b may be affixed to an end of a ball valve. A cam lock may be affixed in a locked position when the pickup tube is to be capped 216a while not connected to an intake channel, or may be affixed in a locked position when an intake channel is desired to be connected to and secured within the interior of the pickup tube 216b. Arms of camlocks 216a, 216b may sit in an axially-oriented position when locked and may be oriented radially when unlocked. Metal components of a pickup tube may be comprised of materials including anodized steel, aluminum, plastic and rubber.

Pickup tube 204b may be connectable to intake channel 116, the body of which may generally include a flow channel 218 of, e.g., rubber. Flow channel 218 may be wrapped in a protective polymer wrap 220. Protective polymer wrap 220 may be cut to desired dimensions through use of an angle grinder of similar tool.

Returning to FIG. 3, vehicle 102 may include intake channel 116, which can run from its connection point to fuel tank 114 (at pickup tube 204b) to lift cage 120 of pump unit 104. When running from fuel tank 104 to lift cage 120, intake channel 116 may run along and over passenger carriage 108. Intake channel 116 may be secured in place through the use of band clamps 302.

Figure 4:
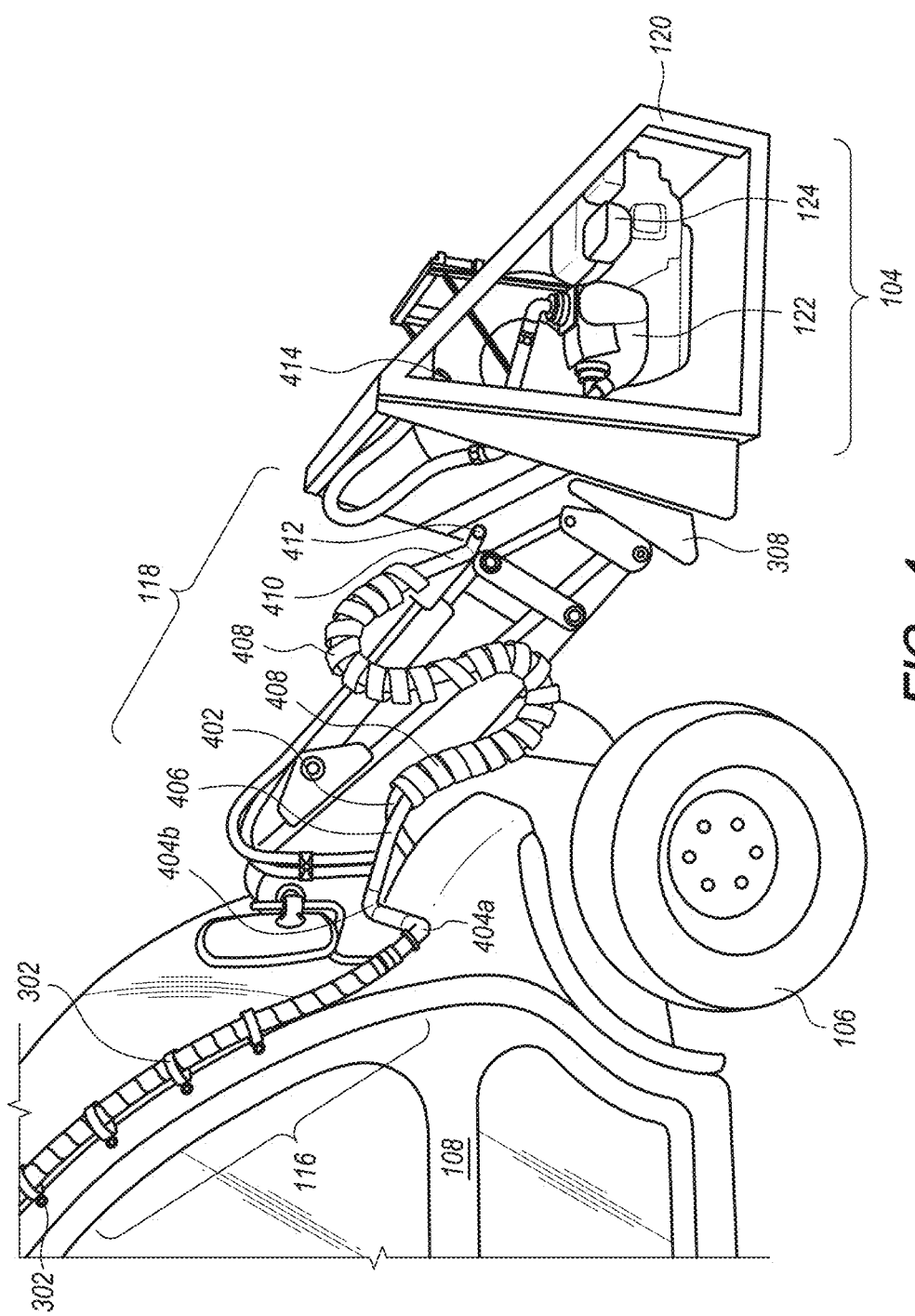
FIG. 4 illustrates a right-side perspective view of a front portion of the embodiment of an apparatus for delivering fuel of FIG. 1.

FIG. 4 illustrates a right-side perspective view of a front portion of the embodiment of an apparatus for delivering fuel of FIG. 1. As depicted in FIG. 4, intake channel 116 runs along passenger carriage 108 of the vehicle and affixed to it through the use of band clamps 302.

Through the use of a threaded swivel, e.g., swivels 404a, 404b, at desired points of flexibility intake channel 116 may connect with an intake channel 406, which runs the length of lift arm 118. Via swivels 404a, 404b, intake channel 406 may be oriented to run at a plurality of angles as needed depending on the positioning of the hydraulic lift. A threaded swivel, e.g., swivels 404a, 404b, may have its interior greased in order to create seals at points of connection with the tube sections of the intake channel.

At about the area that intake channel 406 extends along the hydraulic lift arm 118, intake channel 406 may be routed together with a hydraulic fluid hose 402. Intake channel 406 and hydraulic hose 402 may be routed together in order to reduce the likelihood that either may become tangled in the hydraulic lift equipment when it is being operated and to ensure that both them move in unison when lift is being operated. Intake channel 406 and hydraulic hose 402 may be bound together and protected through the use of a polymer wrap similar to wrap 408 used to cover and protect other portions of the intake channel 116. Polymer wrap 408 covering the intake channel and hydraulic hose may be wrapped in a slightly open fashion to provide for greater flexibility and range of extension when the hydraulic arm is extending and retracting.

The use of the flexible polymer wrap 408 and a plurality of threaded swivels 404a, 404b at desired points along the intake channel, allows the intake channel 406 and the hydraulic hose 402 to be maneuvered, extended, retracted, and bent as needed facilitate the manipulation of the hydraulic lift arm 118 and positioning of the hydraulic lift cage 120 in space.

Hydraulic hose 402 and intake channel 406 may decouple from each other at about the point that intake channel 406 connects with a threaded swivel 410. Intake channel 406 may run along lift cage 120 and pass through an opening in it to connect with pump 122. Intake channel 406 may run along the lift cage and be secured to the back side of it to reduce the amount of excess tubing that must be positioned when the lift is retracted but to allow for an extra length of tubing when it is desirable to extend the lift to a greater degree. Intake channel 406 includes a pair of in-line connectors 412, 414, which may be conveniently disconnected to allow intake channel 416 to be separated from pump 122 without disconnecting directly from pump 122. In an embodiment, connectors 412, 414 include a camlock.

Thus, the majority of intake channel 410 can be detached from pump unit 104 at connectors 412, 414. This allows the entire lift cage 120 to be detached from the metal prongs 308 of the lift head of hydraulic lift arm 118 upon which it rests, without the need to remove the entire intake channel from the vehicle, or detach intake channel 406 from pump 122. Intake channel 406 may connect to pump 122 housed together with an encased motor 124 in lift cage 120.

Figure 5:
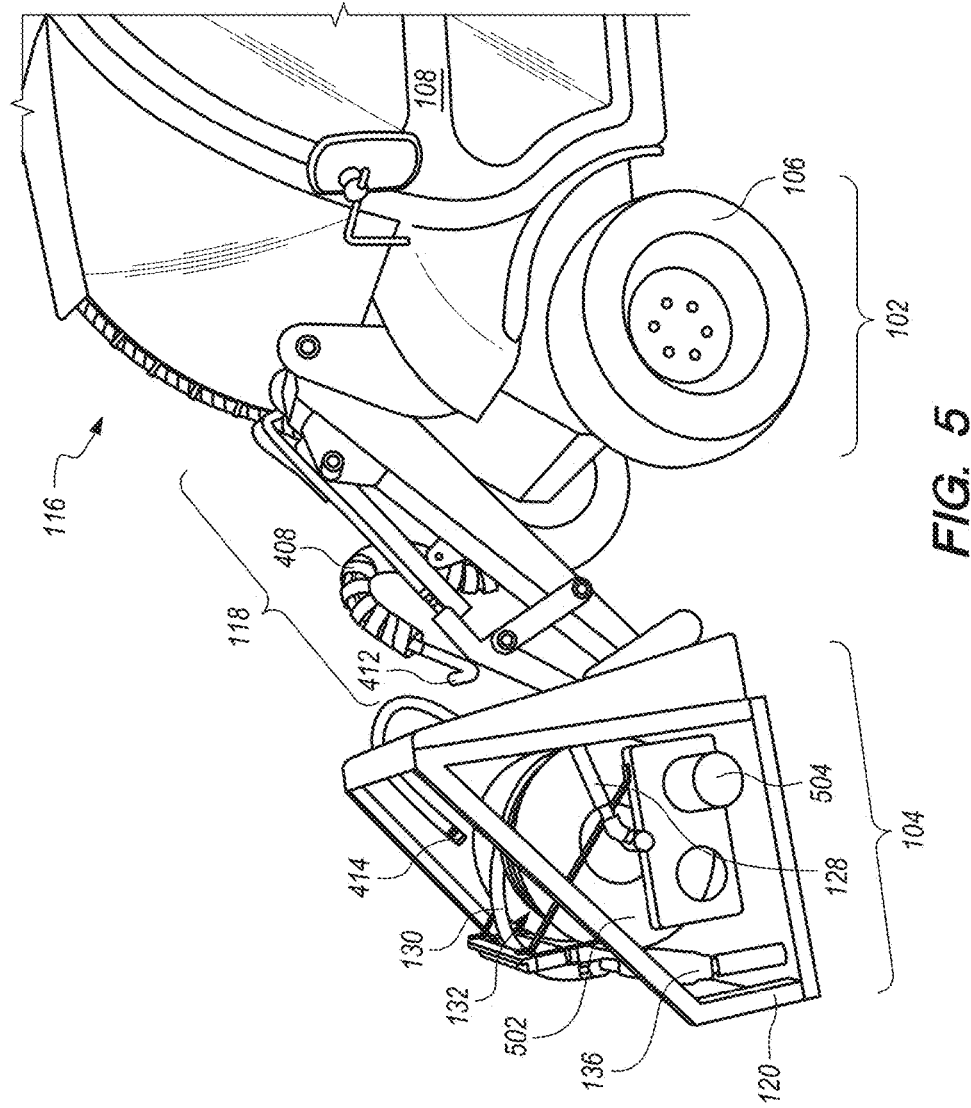
FIG. 5 illustrates a left-side perspective view of a front portion of the embodiment of an apparatus for delivering fuel of FIG. 1.

FIG. 5 illustrates a left-side perspective view of a front portion of the embodiment of an apparatus for delivering fuel of FIG. 1. As depicted in FIG. 5, vehicle 102 may include intake channel 406 with connections 412, 414 and a polymer wrapped section 408 extending along a hydraulic lift arm 118.

Lift cage 120 of pump unit 104 may include a base and metal framework. Lift cage 120 may house a first retractable hose 130 (with an adjustable release nozzle 136) spooled around first hose reel 132 with a central spool and chain-driven plates 134 (FIG. 1), 502. Chain-driven plates 134, 502 may be driven by electric motor 504. In an embodiment, hose reel 132 may be manually rotated. Distribution channel 128 connects the output of pump 120 to first retractable hose 130.

Figure 6:
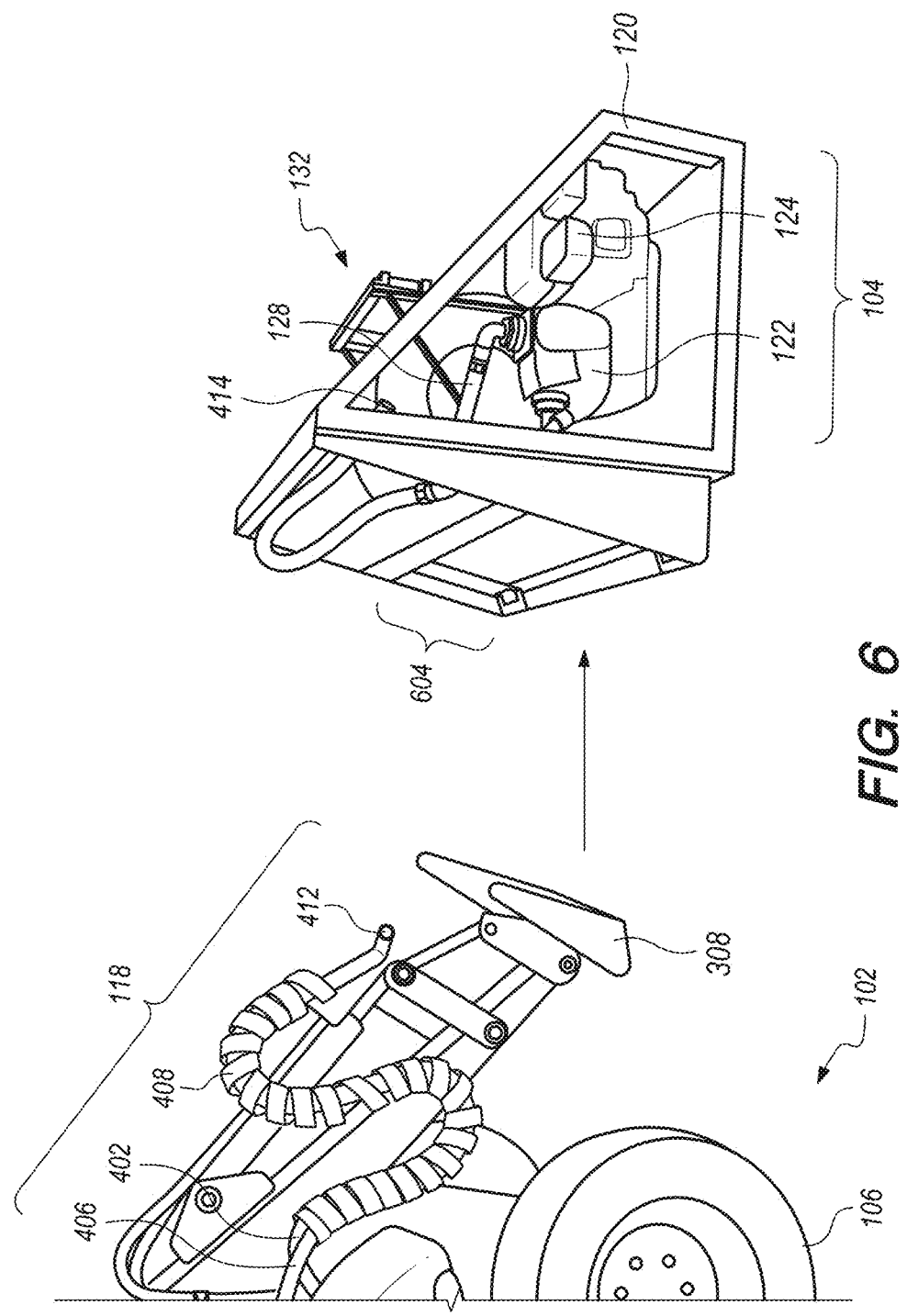
FIG. 6 illustrates a right-side perspective view of a front portion of the embodiment of an apparatus for delivering fuel of FIG. 1 with the pump unit separated from the self-propelled unit.

FIG. 6 illustrates a right-side perspective view of a front portion of the embodiment of an apparatus for delivering fuel of FIG. 1 with pump unit 104 separated from self-propelled unit 102. As depicted in FIG. 6, a pump unit 122 may have intake and outtake ports. When in operation pump 122 may create a vacuum capable of drawing fuel at a high flow rate from fuel tank 114 through intake channels 116, 406 and into pump 122. Pump 122 may create pressure to expel fuel out of pump 122 and through distribution channel 128 to first retractable hose 130.

Controls for regulating pump 122 and for turning on and off engine 124 and electric 504 motor for first retractable reel 132 may each be located at the respective components they control.

Pump unit 104 may be completely detached from lift arm 118 as metal prongs 308 (e.g., a "lift head") of the lift arm can be withdrawn from a receiver 604, which includes openings in the back of cage 120 along the side of the cage that would typically face vehicle 102. Detachment of lift cage 120 from lift arm 118 may be achieved without the need to remove any portion of the intake channel because the intake channel may have its own sections separated at connectors 412, 414.

Separability of the metal-framed lift cage 120 from lift arm 118 of vehicle 102, allows a plurality of lift cages with ready-to-operate pump 122 and enclosed engine 124 units to be left at desired locations. This separability is desirable because pump units with a pump 122, engine 124, distribution channel 128, first retractable hose 130, and a hose reel 132 may be stationed for use in various places while the vehicle travels back and forth with supplies of fuel with less weight encumbrance and more maneuverability given the absence of an attached lift cage. Such pump units may also be shipped separately, as may tank unit 200.

Another embodiment of the apparatus may include a pump that can be powered by hydraulic fluid power supplied by vehicle 102. This would eliminate the need for an extra fuel source to be carried by the vehicle when it is in operation.

Eliminating the need for an additional fuel source for operation of the pump can create more space in the lift cage and can allow the first retractable hose reel to be positioned on top of the pump. Stacking the hose reel on top of the pump can allow space within the lift cage for a second pump and second retractable hose reel to be positioned and connected to a second intake channel and distribution channel.

This configuration can enable fuel to be drawn from the fuel tank twice as fast as in the first preferred embodiment and can allow fuel to be distributed to multiple receptacles at the same time.

Eliminating the need for an additional fuel source for operation of the pump unit can also allow the overall dimensions of the lift cage to be reduced which may allow vehicles with attached lift cages to be maneuvered in more constrained areas of space, as well as further reduce weight related impact of the vehicle and shipping costs where a prefabricated apparatus kit may be sent to a consumer.

Another embodiment of the apparatus may replace wheels 106 of the vehicle with continuous tracks with one track affixed to each side of the vehicle, further reducing the overall weight related impact of the vehicle when in operation.

Another embodiment of the apparatus could also employ four continuous tracks with one such track positioned in a similar fashion as each wheel 106 is now positioned in the embodiment of FIGS. 1-6.

Another embodiment of the apparatus could include an alternatively shaped fuel tank such as a rectangular fuel tank with a height extending to a horizontal plane even with or exceeding that of the top of a cargo cage, thus enabling even greater fuel storage capacity.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A mobile fueling apparatus, comprising:
a self-propelled unit including a lift disposed at a first end of the self-propelled unit and a bed disposed at a second end of the self-propelled unit;
a pump unit including a first frame and a power-driven pump with a pump inlet and a pump outlet;
a first retractable hose;
a tank unit including a fuel tank and a second frame retaining the fuel tank; and
a fuel channel,
wherein: the fuel channel is connected to the fuel tank and to the pump inlet, the first hose is connected to the pump outlet, the power-driven pump is connected to the first frame, the first frame is connected to the lift, the lift is movable between a first height and a second height causing the pump unit to be raised or lowered with respect to the self-propelled unit and the tank unit, and the pump unit remains operable when raised or lowered.

2. The mobile fueling apparatus of claim 1, wherein the self-propelled unit further includes four wheels, each wheel fitted with a low impact tire and configured to rotate about a vertical axis with respect to the self-propelled unit to change a direction of movement of the self-propelled unit.

3. The mobile fueling apparatus of claim 1, wherein the first frame is detachable from the lift.

4. The mobile fueling apparatus of claim 1 further including an engine connected to drive the power-driven pump.

5. The mobile fueling apparatus of claim 1 further including a source of hydraulic power provided by the self-propelled unit and connected to drive the power-driven pump.

6. The mobile fueling apparatus of claim 1, wherein a distribution channel connects the first hose to the pump outlet.

7. The mobile fueling apparatus of claim 1 further including a reel attached to the first frame and connected to an electric motor, wherein the first hose winds about the reel when the reel is rotated in a first direction by the electric motor.

8. The mobile fueling apparatus of claim 1, wherein the bed is configured with a plurality of bed openings, the second frame includes a plurality of frame extensions, and the frame extensions engage the plurality of bed openings and secure the second frame to the bed such that raising the second frame disengages the second frame from the plurality of bed openings and the bed.

9. The mobile fueling apparatus of claim 1, wherein a first portion of the fuel channel includes a second hose and wherein a wrap is about some or all of the fuel channel.

10. A kit capable of being assembled with a self-propelled unit including a bed disposed at a first end of the self-propelled unit and a lift disposed at a second end of the self-propelled unit, to create a mobile fueling apparatus, the kit comprising:
a pump unit including a first frame, and a power-driven pump including a pump inlet and a pump outlet;
a first hose;
a tank unit including a fuel tank and a second frame retaining the fuel tank; and
a fuel channel,
wherein: the fuel channel is connectable to the fuel tank and to the pump inlet, the first hose is connectable to the pump outlet, the power-driven pump is connected to the first frame, the first frame is connectable to the lift such that the lift moving between a first height and a second height causes the pump unit to be raised or lowered with respect to the self-propelled unit and the tank unit, and the pump unit remains operable when raised or lowered.

11. The kit of claim 10 further including an engine connected to the power-driven pump.

12. The kit of claim 10 further including a distribution channel connectable to the first hose and the pump outlet.

13. The kit of claim 10 further including a reel attached to the first frame and connected to an electric motor, wherein the first hose winds about the reel when the reel is rotated in a first direction by the electric motor.

14. The kit of claim 10, wherein the bed is configured with a plurality of bed openings, the second frame includes a plurality of frame extensions, and the frame extensions engage the plurality of bed openings and secure the second frame to the bed such that raising the second frame disengages the second frame from the plurality of bed openings and the bed.

15. The kit of claim 10, wherein a first portion of the fuel channel includes a second hose and wherein a wrap is about the fuel channel.

* * * * *